(12) United States Patent
Miyamoto et al.

(10) Patent No.: US 9,868,475 B2
(45) Date of Patent: Jan. 16, 2018

(54) MULTI-MATERIAL JOINT ASSEMBLY, JOINT AND METHOD FOR A VEHICLE

(71) Applicant: Honda Motor Co., Ltd., Tokyo (JP)

(72) Inventors: Makoto Miyamoto, Dublin, OH (US); Hirokazu Matsuura, Dublin, OH (US); Koji Nozoe, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 14/990,880

(22) Filed: Jan. 8, 2016

(65) Prior Publication Data

US 2017/0197668 A1    Jul. 13, 2017

(51) Int. Cl.
   *B62D 27/02* (2006.01)
   *B62D 65/02* (2006.01)
   *B62D 29/00* (2006.01)
   *B60K 13/02* (2006.01)
   *B62D 25/02* (2006.01)

(52) U.S. Cl.
   CPC .......... *B62D 27/02* (2013.01); *B62D 29/005* (2013.01); *B62D 65/02* (2013.01); *B60K 13/02* (2013.01); *B62D 25/02* (2013.01)

(58) Field of Classification Search
   CPC ......... B62D 27/02; B62D 65/02; B60K 13/02
   USPC ................................. 296/191, 29, 30, 1.06
   See application file for complete search history.

(56) References Cited

U.S. PATENT DOCUMENTS

| | | | |
|---|---|---|---|
| 3,013,643 A * | 12/1961 | Perry | F16B 5/0258 238/DIG. 1 |
| 3,348,444 A * | 10/1967 | Brignola | F16B 19/10 411/38 |
| 4,579,491 A | 4/1986 | Kull | |
| 4,832,548 A | 5/1989 | Strobel | |
| 5,123,792 A * | 6/1992 | Strobel | F16B 19/1063 411/43 |
| 5,314,280 A * | 5/1994 | Gagliardi | B62D 25/163 29/525.02 |
| 5,458,393 A * | 10/1995 | Benedyk | B62D 23/005 280/798 |
| 6,533,302 B2 | 3/2003 | Scruggs et al. | |

(Continued)

OTHER PUBLICATIONS

Website: http://www.lobfs.com/pages/p65.html, "Technical Guide Rivet Design Materials Co., Ltd. Lobtex Co., Ltd. Fastening System", 3 pages, printed Jan. 7, 2016 (Japanese and English translations).

*Primary Examiner* — Jason S Morrow
*Assistant Examiner* — E Turner Hicks
(74) *Attorney, Agent, or Firm* — Rankin, Hill & Clark LLP

(57) ABSTRACT

A multi-panel joint assembly, joint and method for a vehicle includes a first panel forming an outer skin on the vehicle, a second panel having a second panel flange portion overlapping the first panel, a third panel having a third panel flange portion overlapping the second panel flange portion, throughholes in registry with one another defined respectively in the first panel, the second panel flange portion, and the third panel flange portion, a rivet nut received through the throughole of the first panel, a fastener received through the throughholes of the second and third panels and threadedly secured to the rivet nut for securing the second and third panels to the first panel, and a washer interposed between the first panel and a deformed portion of the rivet nut for protecting the first panel from being damaged by the deformed portion.

21 Claims, 4 Drawing Sheets

(56) References Cited

U.S. PATENT DOCUMENTS

| | | | |
|---|---|---|---|
| 6,538,894 B1 | 3/2003 | Treiber et al. | |
| 6,776,566 B2* | 8/2004 | Kobusch | F16B 5/0283 411/432 |
| 6,893,196 B2 | 5/2005 | Wille | |
| 7,252,469 B2* | 8/2007 | Zaluzec | B62D 23/00 411/34 |
| 7,303,366 B2* | 12/2007 | Smith | F16B 19/1072 411/34 |
| 7,641,271 B1* | 1/2010 | Haydin | B60R 16/0222 16/2.1 |
| 8,033,003 B2 | 10/2011 | Scheinberger et al. | |
| 8,082,700 B2 | 12/2011 | Kennedy et al. | |
| 8,484,873 B2 | 7/2013 | Splittgerber | |
| 2005/0201844 A1 | 9/2005 | Davies et al. | |
| 2005/0214096 A1* | 9/2005 | Zaluzec | B62D 23/00 411/104 |
| 2006/0078399 A1 | 4/2006 | Coddington et al. | |
| 2012/0048261 A1 | 3/2012 | Kuntze et al. | |
| 2013/0306644 A1 | 11/2013 | Howell et al. | |

\* cited by examiner

MULTI-MATERIAL JOINT ASSEMBLY, JOINT AND METHOD FOR A VEHICLE

BACKGROUND

Modern vehicles increasingly employ a variety of material types that are joined together with various fasteners. For example, vehicle bodies and panels connected thereto can be formed of varying materials that need to be secured to one another. Many challenges occur at fastening locations for such multi-material panels in that the structural characteristics vary from one panel to another (e.g., rates of thermal expansion, hardness, rigidity, etc.).

SUMMARY

According to one aspect, a multi-material joint for a vehicle includes a first panel defining a first panel throughole and a rivet nut having a rivet nut flange positioned on a first side of the first panel, a rivet nut sleeve extending from the rivet nut flange that is received through the first panel throughole, a rivet nut axial throughole defined axially through the rivet nut sleeve and internal threads radially extending from the rivet nut sleeve into the rivet nut axial throughole. The rivet nut sleeve is deformed to include a bulged portion disposed on a second side of the first panel to secure the rivet nut to the first panel. The multi-material joint further includes a washer disposed between the first panel and the bulged portion for protecting the first panel from forces exerted thereon by the bulged portion. Further, the multi-material joint includes a second panel defining a second panel throughole and a third panel defining a third panel throughole. The second panel is arranged relative to the first panel such that the second panel throughole is in registry with the first panel throughole. Likewise, the third panel is arranged relative to the first panel such that the third panel throughole is also in registry with the first panel throughole. The multi-material joint still further includes a bolt received through each of the first panel throughole, the second panel throughole and the third panel throughole, and threadedly engaged with the internal threads to secure the second and third panels to the first panel.

According to another aspect, a method of joining panel flanges of varying materials in a vehicle includes positioning a washer on a blind side of a first panel to position a washer aperture defined by the washer in registry with a first panel throughole defined in the first panel; inserting a rivet nut sleeve of a rivet nut through the first panel throughole defined in the first panel and through the washer aperture of the washer to position a flange of the rivet nut against a non-blind side of the first panel; and deforming the rivet nut sleeve to create the bulged portion along the rivet nut sleeve for securing the rivet nut to the first panel. The method further includes positioning a second panel on the non-blind side of the first panel to position a second panel throughole in registry with an axial throughole of the rivet nut; positioning a third panel on the non-blind side of the first panel to position a third panel throughole in registry with the axial throughole of the rivet nut, and inserting a bolt through the second and third panel throughholes and threadedly connecting the bolt to internal threads extending radially form the rivet nut sleeve into the axial throughole of the rivet nut to thereby secure the second and third panels to the first panel.

According to a further aspect, a multi-panel joint assembly for a vehicle includes a first panel forming an outer skin on the vehicle, a second panel having a second panel flange portion overlapping the first panel, and a third panel having a third panel flange portion overlapping the second panel flange portion. The multi-panel joint assembly further includes throughholes in registry with one another defined respectively in the first panel, the second panel flange portion, and the third panel flange portion. Still further, the multi-panel joint assembly includes a rivet nut received through the throughole of the first panel, a fastener received through the throughholes of the second and third panels and threadedly secured to the rivet nut for securing the second and third panels to the first panel, and a washer interposed between the first panel and a deformed portion of the rivet nut for protecting the first panel from being damaged by the deformed portion.

DETAILED DESCRIPTION

Figure 1:
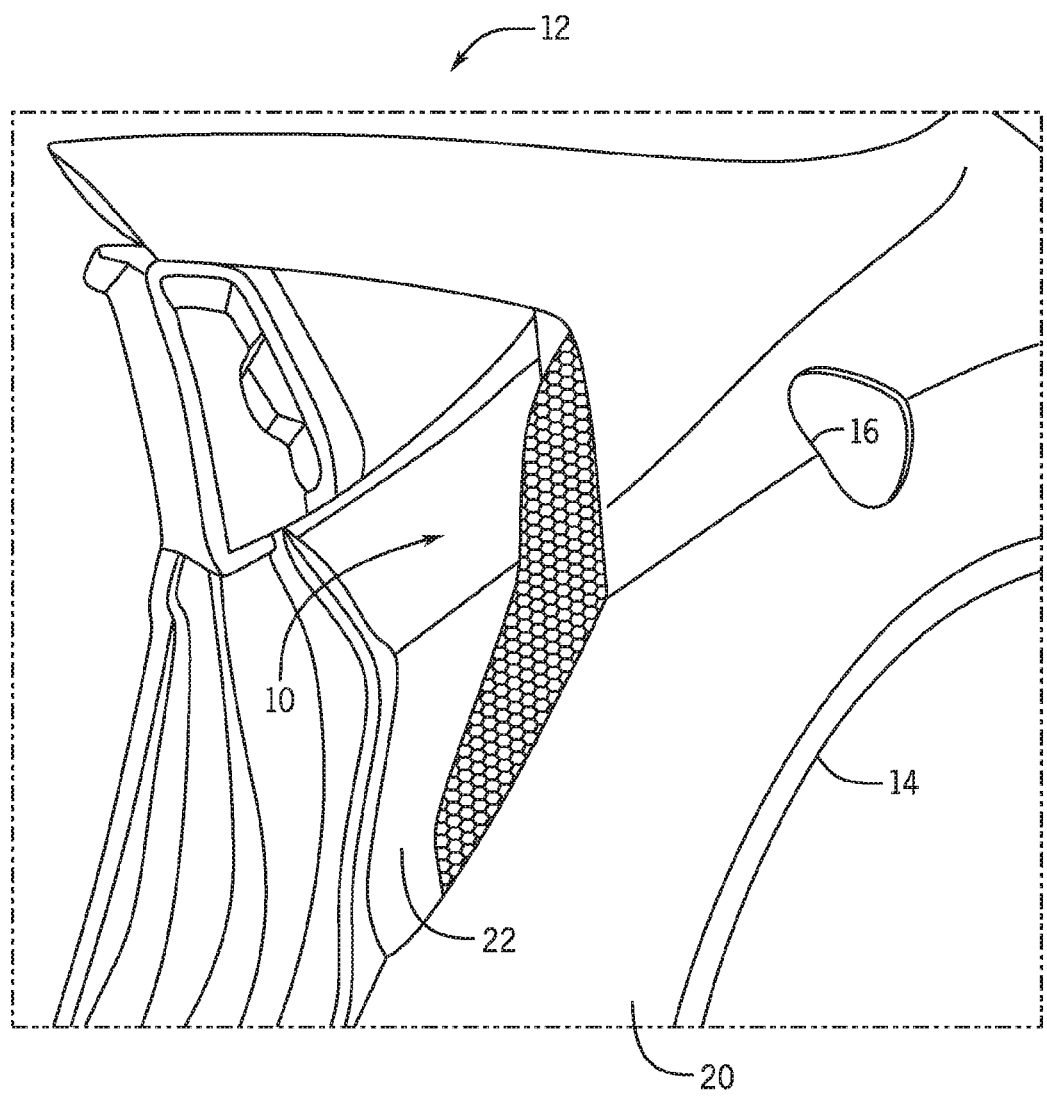
FIG. 1 is a partial perspective view of a vehicle, particularly showing a rear air intake on the vehicle, according to an exemplary embodiment.
Figure 2:
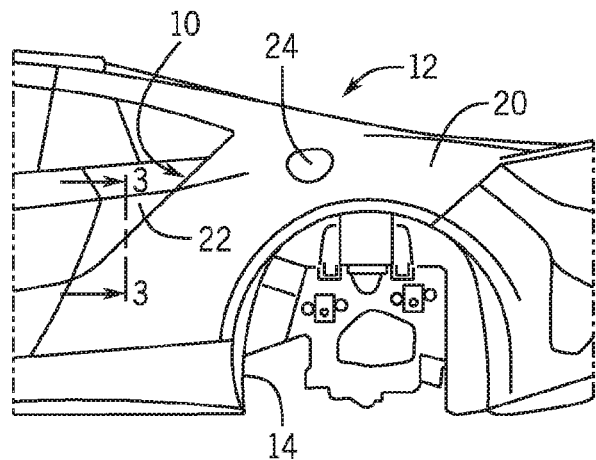
FIG. 2 is a partial side elevation view of the vehicle corresponding to the portion of the vehicle shown in FIG. 1.

Referring now to the drawings, wherein the showings are for purposes of illustrating one or more exemplary embodiments and not for purposes of limiting the same, FIG. 1 shows an air intake 10 provided on a vehicle 12 according to an exemplary embodiment. In particular, as shown, the air intake 10 is positioned rearwardly on the vehicle 12 immediately forward of a rear wheel well 14 and a fuel aperture 16 for refueling the vehicle 12. The air intake 10 is defined by a first panel 20 that forms a skin of or on the vehicle 12. The air intake 10 is also defined by an inner panel 22 spaced laterally apart from the first panel 20 at the location of the air intake 10. In one embodiment, the air intake 10 provides air flow to a rear mounted engine (not shown) provided on the vehicle 12. With additional reference to FIG. 2, a fuel cap 24 can be accommodated within the fuel aperture 16 of the first panel 20.

Figure 3:
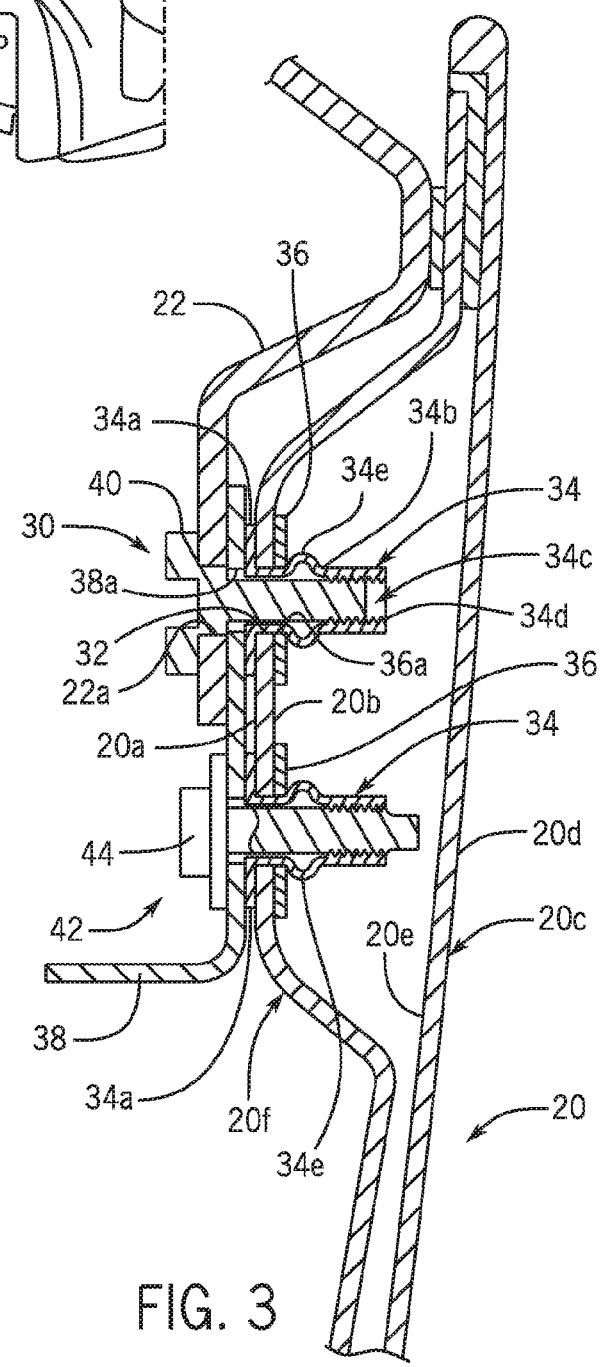
FIG. 3 is a cross-section view taken at the line 3-3 of FIG. 2.

With further reference to FIG. 3, a multi-material joint assembly or joint 30 is shown for the vehicle 12. The multi-material joint 30 includes the first panel 20 defining a first panel throughole 32 and a rivet nut 34. The rivet nut 34 can have a rivet nut flange 34a positioned on a first side 20a of the first panel 20. The first side 20a can be referred to as a non-blind side of the first panel 20 because it is a side of the first panel 20 viewable when constructing the assembly or joint 30. Additionally, the rivet nut 34 includes a rivet nut sleeve 34b extending from the rivet nut flange 34a that is received through the first panel throughole 32, a rivet nut axial throughole 34c defined axially through the rivet nut sleeve 34b and the rivet nut flange 34a, and internal threads 34d radially extending from the rivet nut sleeve 34b into the rivet nut axial throughole 34c. The rivet nut sleeve 34b is, as shown, deformed to include a bulged or deformed portion 34e disposed on a second side 20b of the first panel 20 to secure the rivet nut 34 to the first panel 20. The second side 20b can be referred to as a blind side of the first panel 20 because it is a side of the first panel 20 that is not viewable (i.e., is blind or hidden) when constructing the assembly or joint 30. The multi-material joint 30 further includes a washer 36 disposed between the first panel 20, and particularly adjacent the second side 20b, and the bulged portion 34e for protecting the first panel 20 from forces exerted thereon by the bulged portion 34e as will be explained in further detail below.

Still further, the multi-material joint 30 includes a second panel, which in the joint 30 is second panel 38. The second panel 38 can be, for example, a bracket that is secured at an end (not shown) opposite the joints 30, 42 to a frame (not shown) of the vehicle 12. The second panel 38 defines a second panel throughole 38a. As shown, the second panel 38 is arranged relative to the first panel 20 such that the second panel throughole 38a is in registry with the first panel throughole 32. The multi-material joint 30 can further include a third panel, which in the illustrated joint is the inner panel 22. As shown, the third panel 22 defines a third panel throughole 22a and is arranged relative to the first panel 20 such that the third panel throughole 22a is also in registry with the first panel throughole 32. The multi-material joint 30 can additionally include a fastener, such as illustrated bolt 40, received through each of the first panel throughole 32, the second panel throughole 38a, and the third panel throughole 22a and threadedly engaged with the internal threads 34d to secure the second and third panels 38, 22 to the first panel 20.

Optionally, the second panel 38 can additionally be secured to the first panel 20 via another multi-material joint 42. Many of the same components from the joint 30 can be used in the joint 42 such that like reference numerals are used for like components. In particular, the joint 42 can include rivet nut 34 and washer 36. A fastener 44 in the form of a bolt is also used but, as shown, can vary in shape relative to the fastener 40. Also, in the joint 42, the inner panel 22 is not included and thus is not secured to the first panel 20 via the threaded connection of the fastener 44 to the rivet nut 34.

In one exemplary embodiment, the first panel 20 is formed of a composite material and the third panel is formed of a plastic material. Accordingly, the first panel 20 can be a composite outer body panel on the vehicle 12. As shown, the second panel 38 is arranged so as to be interposed between the first panel 20 and the third panel 22. For example, the first panel 20 can be a sheet molded composite (SMC) and the third panel can be formed of an amorphous thermal plastic alloy of polycarbonate and acrylate-styrene-acrylonitrile terpolymer. The second panel 38 can be formed of a metal or metal alloy (e.g., steel). In the same or a different embodiment, the first panel 20 can be a composite panel formed of at least a plastic material and the rivet nut 34 can be formed of a metal or metal alloy.

As shown in FIG. 3, the first panel 20 includes a first wall portion 20c having a show surface 20d and an underside surface 20e, and a second wall portion 20f integrally formed with the first wall portion 20c. The second wall portion 20f is folded under the first wall portion 20c, at least at the cross-section location shown in FIG. 3. The second wall portion 20f has an upper surface that faces the underside surface 20e of the first wall portion 20c and an opposite surface. The upper surface of the second wall portion 20f is the second side 20b of the first panel 20 that is engaged by the bulged portions 34e of the rivet nuts 34 and the opposite surface is the first side 20a of the first panel 20 that is engaged by the rivet nut flanges 34a of the rivet nuts 34.

Figure 4:
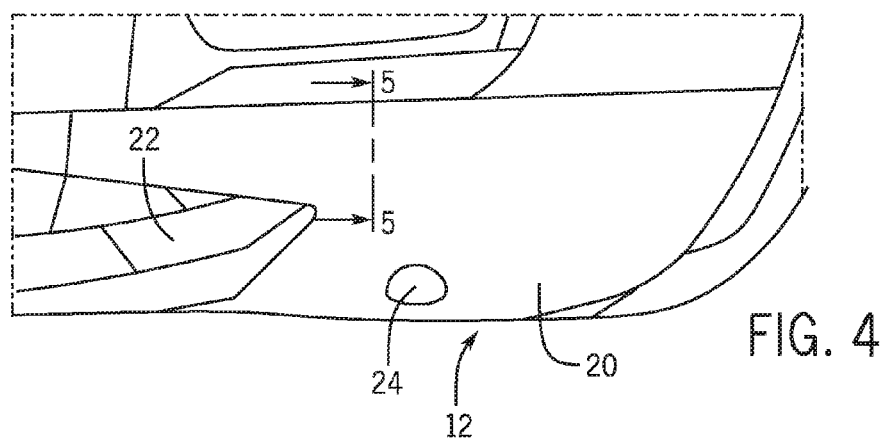
FIG. 4 is a partial overhead view of the vehicle corresponding to the portion of the vehicle shown in FIG. 1.
Figure 5:
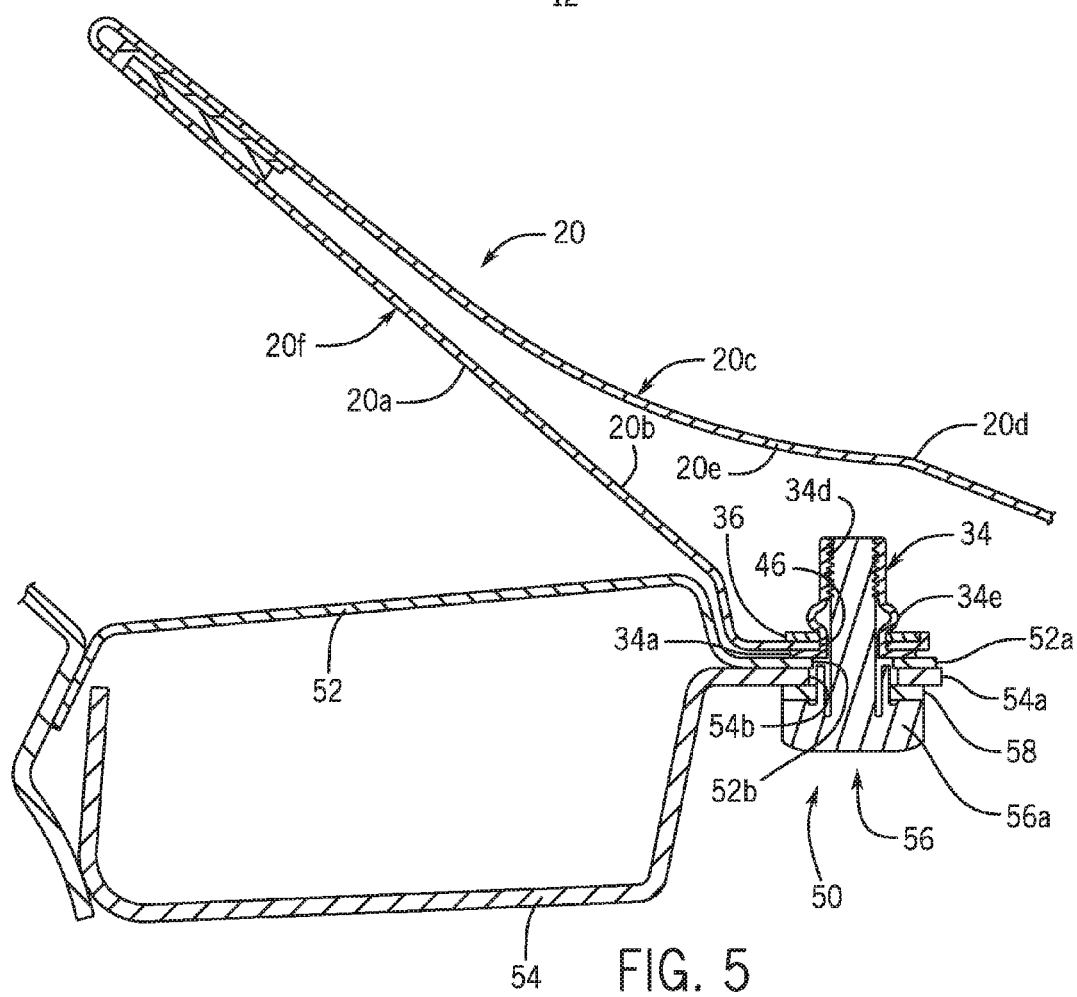
FIG. 5 is a cross-section view taken along the line 5-5 of FIG. 4.
Figure 6:
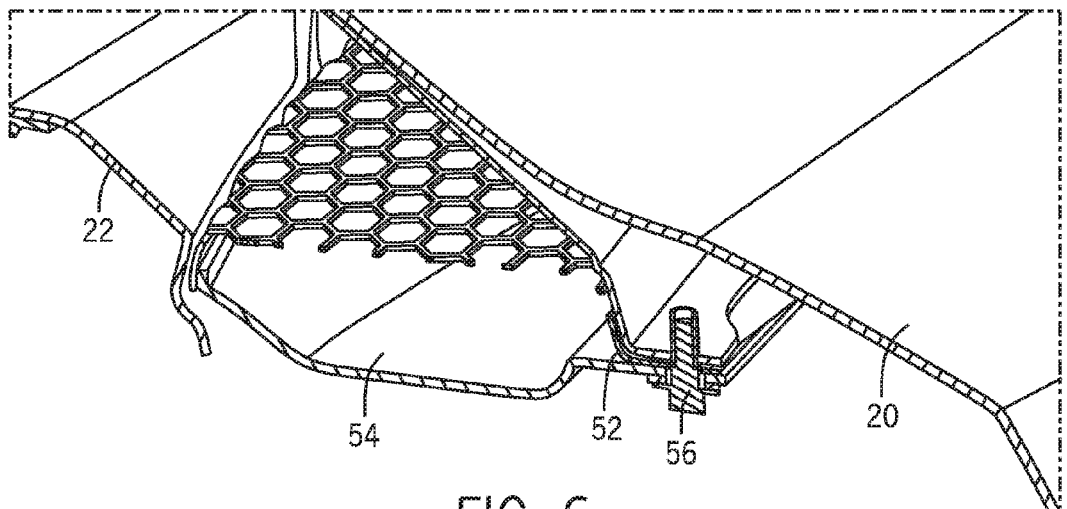
FIG. 6 is a perspective cross-section view corresponding to the cross-section of FIG. 5.

With reference now to FIGS. 4-6, another multi-material joint assembly or joint 50 is illustrated for the vehicle 12. Except as indicated herein below, the multi-material joint 50 can be the same or similar as the multi-material joint 30. In particular, the multi-material joint 50 includes the first panel 20 which, as already discussed above, forms an outer skin on the vehicle 12, a second panel 52 having a second panel flange portion 52a overlapping the first panel 20, and a third panel 54 having a third panel flange portion 54a overlapping the second panel flange portion 52a. Accordingly, in the joint 50, the second panel 38 of the joint 30 is replaced by the second panel 52 and the inner panel 22 is replaced by the third panel 54.

The first panel 20 can include another throughole 46 like the throughole 32 of the joint 30. Like the panels 22, 38 of FIG. 3, the panels 52, 54 of FIG. 5 include respective throughholes 52b and 54b. The throughholes 46, 52b, 54b are in registry with one another as shown in FIG. 5. A rivet nut, which can be the same as the rivet nut 34 in FIG. 3, is received through the throughole 46 of the first panel 20. A fastener 56, which can be a bolt, is received through the throughholes 52b, 54b of the second and third panels 52, 54 and is threadedly secured to the rivet nut 34 for securing the second and third panels 52, 54 to the first panel 20. A washer, which can be the same as the washer 36, is interposed between the first panel 20 and deformed portion 34e of the rivet nut 34 for protecting the first panel 20 from being damaged by the deformed portion 34e.

In contrast to the joint 30, the washer 36 in the joint 50 can be a first washer and the joint 50 can further include a second washer 58 interposed between a head 56a of the fastener 56 and the third panel 54 for protecting the third panel 54. Thus, the second washer 58 is disposed between and engages each of the head 56a of the fastener 56 and the third panel 54. Though not shown, a second washer (e.g., like washer 58) could also be used in the joint 30 between the head of the fasteners 40, 44 and the upper-most panels (e.g., panel 22 from the fastener 40 and panel 38 for the fastener 44).

As best shown in FIG. 6, the second panel 52 can be formed and arranged as a portion of a mesh intake cover for the air intake 10. As for material composition, the third panel 54 can optionally be formed of a plastic material and the second panel 52 can optionally be formed of a metal or metal alloy (e.g., steel). As discussed above, the first panel 20 can be a composite outer body panel on the vehicle 12. Again, the first panel 20 of FIG. 5 can include a first wall portion 20c having a show surface 20d and an underside surface 20e, and a second wall portion 20f integrally formed with the first wall portion 20c. The second wall portion 20f is folded under the first wall portion 20c. The second wall portion 20f has an upper surface that forms first side 20a facing the underside surface 20e of the first wall portion 20c and an opposite surface that forms the second side 20b of the first panel 20. The second side 20b of the second wall portion 20f is engaged by the bulged portion of the 34e of the rivet nut 34 and the first side 20a of the first panel 20 is engaged by the rivet nut flange 34a of the rivet nut 34.

Figure 7:
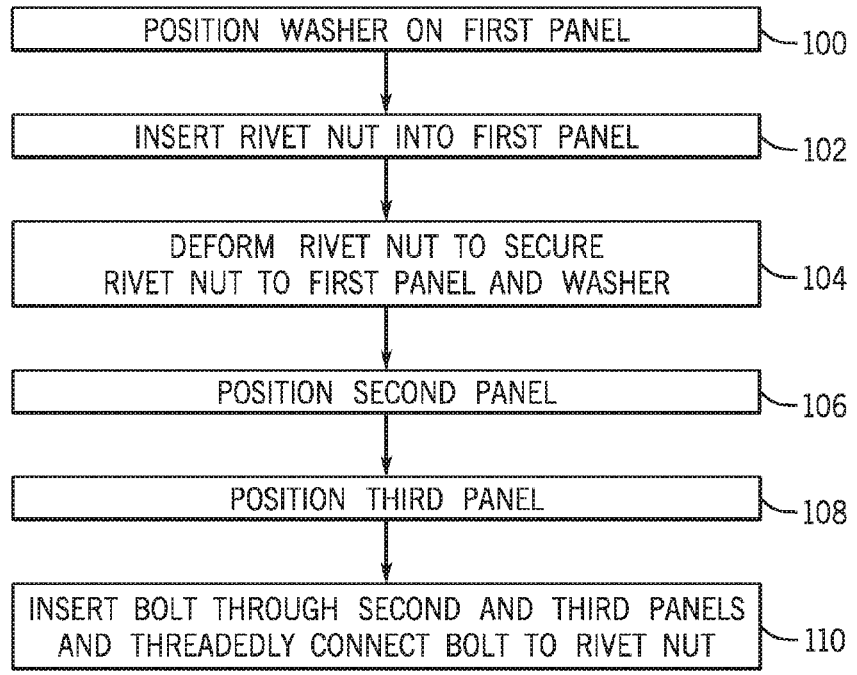
FIG. 7 is a process flow chart illustrating a method of joining panels of varying materials in a vehicle according to an exemplary embodiment.

With reference now to FIG. 7, a multi-material joint method of joining panel flanges of varying materials in a vehicle will now be described. In particular, the method of FIG. 7 will be described in association with one of the multi-material joints described hereinabove (e.g., joints 30 or 50); however, it is to be appreciated that the method could be used with other joints and/or assemblies. In the method, at 100, washer 36 is positioned on the second side 20*b* of the first panel 20 (which can be referred to as the blind side as mentioned above) to position a washer aperture 36*a* defined by the washer 36 in registry with the first panel throughole (e.g., throughole 32 or 46) defined in the first panel 20. Next, at 102, the rivet nut sleeve 34*b* of the rivet nut 34 is inserted through the first panel throughole (e.g., throughole 32 or 46) defined in the first panel 20 and through the washer aperture 36*a* of the washer 36 to position the flange 34*a* of the rivet nut 34 against the first side 20*a* of the first panel 20 (which can be referred to as a non-blind side as mentioned above).

Then, at 104, the rivet nut sleeve 34*b* is deformed to create the bulged portion 34*e* thereon for securing the rivet nut 34 and the washer 36 to the first panel 20 and washer 36. At 106, a second panel, such as panel 38 or panel 52, can be positioned on the non-blind side 20*a* of the first panel 20 to position a second panel throughole (e.g., throughole 38*a* or 52*b*) in registry with the axial throughole 34*c* of the rivet nut 34. At 108, a third panel (e.g., inner panel 22 or third panel 54) can be positioned on the non-blind side 20*a* of the first panel 20 to position a third panel throughole (e.g., throughole 22*a* or 54*b*) in registry with the axial throughole 34*c* of the rivet nut 34.

Next, at 110, a fastener (e.g., bolt 40 or 56) is inserted through the second and third panel throughholes and the bolt is threadedly connected to internal threads 34*d* defined in the axial throughole 34*c* of the rivet nut 34 to thereby secure the second and third panels to the first panel 20. Optionally, though not shown in FIG. 7, a second washer, such as second washer 58, can be positioned on a threaded shank of the bolt (e.g., 44 or 56) prior to inserting the bolt through the second and third panel throughholes to arrange the second washer between a head of the bolt and an adjacent one of the second and third panels.

It will be appreciated that various of the above-disclosed and other features and functions, or alter natives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-material joint for a vehicle, comprising:
   a first panel defining a first panel throughole;
   a one-piece rivet nut having a rivet nut flange positioned on a first side of the first panel, a rivet nut sleeve extending from the rivet nut flange that is received through the first panel throughole, a rivet nut axial throughole defined axially through the rivet nut sleeve, and internal threads radially extending from the rivet nut sleeve into the rivet nut axial throughole, wherein the rivet nut sleeve is deformed to include a bulged portion disposed on a second side of the first panel to secure the rivet nut to the first panel;
   a non-expanding washer disposed between the first panel and the bulged portion for protecting the first panel from forces exerted thereon by the bulged portion;
   a second panel defining a second panel throughole, the second panel arranged relative to the first panel such that the second panel throughole is in registry with the first panel throughole;
   a third panel defining a third panel throughole, the third panel arranged relative to the first panel such the third panel throughole is also in registry with the first panel throughole; and
   a bolt received through each of the first panel throughole, the second panel throughole and the third panel throughole and threadedly engaged with the internal threads to secure the second and third panels to the first panel.

2. The multi-material joint of claim 1 further including:
   a second washer disposed between and engaging each of a head of the bolt and the third panel.

3. The multi-material joint of claim 1 wherein the first panel is formed of a composite material and the third panel is formed of a plastic material, wherein the second panel is arranged between the first panel and the third panel.

4. The multi-material joint of claim 3 wherein the second panel is metal or a metal alloy.

5. The multi-material joint of claim 4 wherein the second panel is formed and arranged as a portion of an air intake cover.

6. The multi-material joint of claim 1 wherein the first panel is a composite outer body panel on the vehicle.

7. The multi-material joint of claim 6 wherein the composite outer body panel includes a first wall portion having a show surface and an underside surface, and a second wall portion integrally formed with the first wall portion, the second wall portion folded under the first wall portion, the second wall portion having an upper surface that faces the underside surface of the first wall portion and an opposite surface, the upper surface of the second wall portion is said second side of the first panel that is engaged by the bulged portion of the rivet nut and the opposite surface is said first side of the first panel that is engaged by the flange of the rivet nut.

8. A method of joining panel flanges of varying materials in a vehicle, comprising:
   positioning a washer on a blind side of a first panel and in engagement with the blind side to position a washer aperture defined by the washer in registry with a first panel throughole defined in the first panel;
   after positioning the washer on the blind side, inserting a rivet nut sleeve of a rivet nut through the first panel throughole defined in the first panel and through the washer aperture of the washer to position a flange of the rivet nut against a non-blind side of the first panel;
   deforming the rivet nut sleeve to create a bulged portion along the rivet nut sleeve for securing the rivet nut to the first panel;
   positioning a second panel on the non-blind side of the first panel to position a second panel throughole in registry with an axial throughole of the rivet nut;
   positioning a third panel on the non-blind side of the first panel to position a third panel throughole in registry with the axial throughole of the rivet nut; and
   inserting a bolt through the second and third panel throughholes and threadedly connecting the bolt to internal threads extending radially from the rivet nut sleeve into the axial throughole of the rivet nut to thereby secure the second and third panels to the first panel.

9. The method of claim 8 further including:
   positioning a second washer on a threaded shank of the bolt prior to inserting the bolt through the second and third panel throughholes to arrange the second washer between a head of the bolt and an adjacent one of the second and third panels.

10. The method of claim 8 wherein positioning the third panel includes sandwiching the second panel between the first panel and the third panel.

11. The method of claim 8 wherein the first panel is formed from a material that is less rigid than the rivet nut.

12. The method of claim 11 wherein the rivet nut is metal or a metal alloy.

13. The method of claim 12 wherein the first panel is formed from a composite material.

14. The method of claim 8 wherein one of the second and third panels is formed from metal and the other of the second and third panels is formed from a material that is less rigid than metal.

15. The method of claim 8 wherein the first panel includes a first wall portion having a show surface and an underside surface, and a second wall portion integrally formed with the first wall portion, the second wall portion folded under the first wall portion, the second wall portion having an upper surface that faces the underside surface of the first wall portion and an opposite surface, the upper surface of the second wall portion is said second side of the first panel that is engaged by the bulged portion of the rivet nut and the opposite surface is said first side of the first panel that is engaged by the flange of the rivet nut.

16. A multi-panel joint assembly for a vehicle, comprising:
a first panel forming an outer skin on the vehicle;
a second panel having a second panel flange portion overlapping the first panel;
a third panel having a third panel flange portion overlapping the second panel flange portion;
throughholes in registry with one another defined respectively in the first panel, the second panel flange portion and the third panel flange portion;
a rivet nut received through the throughole of the first panel;
a fastener received through the throughholes of the second and third panels and threadedly secured to the rivet nut for securing the second and third panels to the first panel; and
a flat non-expanding washer interposed between the first panel and a deformed portion of the rivet nut for protecting the first panel from being damaged by the deformed portion.

17. The multi-panel joint assembly of claim 16 wherein the washer is a first washer and the multi-panel joint assembly further includes a second washer interposed between a head of the fastener and the third panel for protecting the third panel.

18. The multi-panel joint assembly of claim 16 wherein the first panel is a composite panel formed of at least a plastic material and the rivet nut is formed of a metal or metal alloy.

19. The multi-panel joint assembly of claim 18 wherein the second panel is formed a metal or metal alloy.

20. The multi-panel joint assembly of claim 19 wherein the third panel is formed of an amorphous thermoplastic alloy of polycarbonate and acrylic-styrene-acrylonitrile terpolymer.

21. The multi-material joint of claim 1 wherein the second panel is formed and arranged as a portion of an air intake cover.

* * * * *